Feb. 4, 1969
C. H. SNOW
3,425,269
LOCK TESTER FOR AIRCRAFT CARGO HANDLING SYSTEM
Filed Nov. 14, 1966
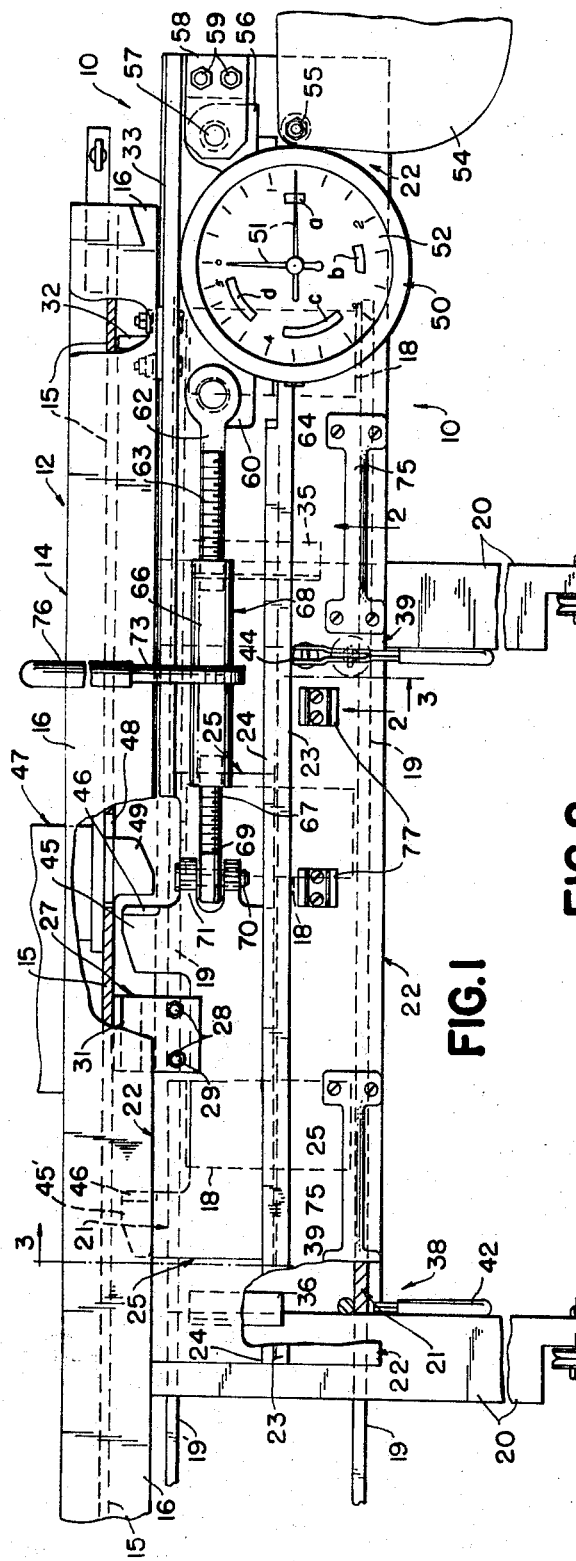
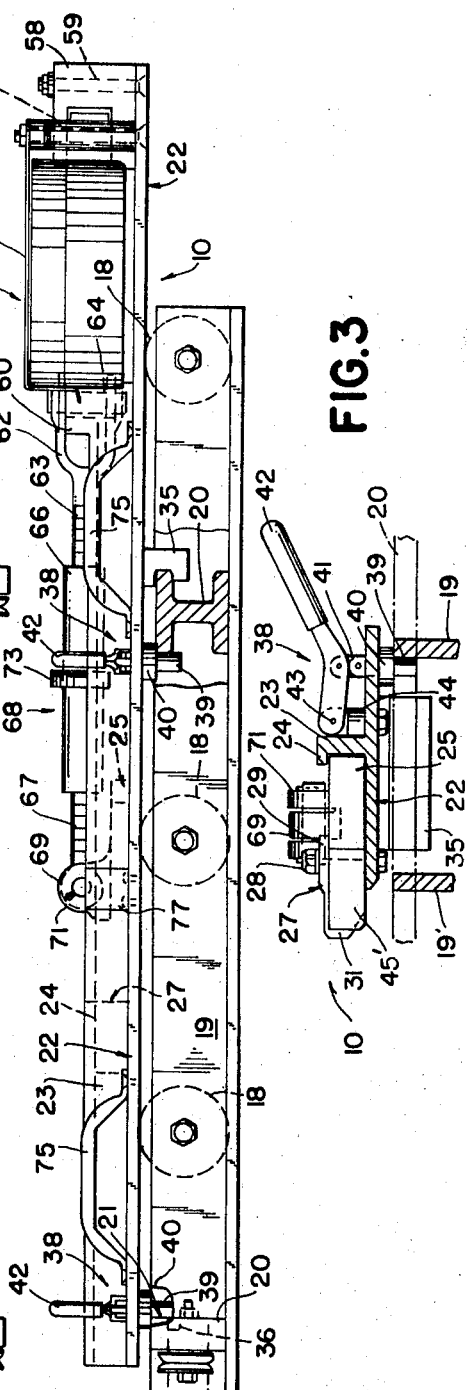
INVENTOR.
CONLEY H. SNOW
BY Whittemore, Hulbert & Belknap
ATTORNEYS United States Patent Office 3,425,269
Patented Feb. 4, 1969

3,425,269
LOCK TESTER FOR AIRCRAFT CARGO HANDLING SYSTEM
Conley H. Snow, Royal Oak, Mich., assignor to Brooks & Perkins, Incorporated, Detroit, Mich., a corporation of Delaware
Filed Nov. 14, 1966, Ser. No. 593,927
U.S. Cl. 73—88
Int. Cl. G01n 3/16
19 Claims

ABSTRACT OF THE DISCLOSURE

A tester for aircraft load restraining locks features a portable support having a slidable dog engageable with a part of the lock to apply testing force to that part. The dog is connected by a mechanical advantage turnbuckle unit to an instrument recording the force. The tester has means to quickly mount the same for successive testing of a series of locks.

---

The present invention relates to an improved tester for certain locks incorporated in an aircraft cargo loading and handling system such as is the subject matter of a copending application of Mollon, Rykwalder and Pinchot, Ser. No. 282,008, filed May 21, 1963, now Patent No. 3,359,983, which system is presently in use on U.S. Military C-130 Aircraft. By way of explanation, the system of that application employs a so-called left-hand combination of locks, which are sequentially locked up in a forward to aft succession under the control of a load master, and sequentially unlocked for release of load pallets restrained by the locks in the reverse sequence. The system of the Mollon et al. application also includes a so-called right-hand series of locks which are operated under the force of parachute drag on the pallets, once the left-hand locks have been released, for the delivery of the loaded pallets in flight.

It is for the testing of the restraining strength of such right-hand locks that the present improved tester has been devised. Each right-hand lock is calibrated at the factory to provide the necessary aft restraining force and proper release when a given parachute drag force is applied during aerial delivery aloft. Therefore, if reliable performance is to be maintained, it is necessary to test the locks periodically; and it is highly desirable that this testing be capable of performance at the time of initial installation of the system in the aircraft, as well as periodically during the maintenance or repair life of the locks, using a single type of test equipment. It is, therefore, an object of the invention to provide a testing device or mechanism for these purposes which is of compact and light-weight construction, so as to be readily portable by a single man from lock to lock along the right-hand system; and which has simple and rugged provisions for readily and quickly applying the same to the frame-work of the system in preparation for performing the test, and is just as easily and quickly removed from the frame following the test.

In view of the fact that the locks, as installed in the system, are adjustably settable to provide restraint force ranging from 250 lbs.–4,000 lbs., in 250 lb. increments, as determined by the size of the load and the parachute extraction force in aerial delivery, the tester of the invention provides a slide which is guided horizontally on a suitable supporting plate removably attachable to the frame work of the cargo system, which slide has a dog-like projecting pad adapted to engage with a detent or dog member of a right-hand lock, just as the member is operatively engaged in a notch of the load pallet to restrain the latter in flight. The tester further includes means operatively connected to the slide, when the tester is mounted and anchored on the frame work of the installation, to apply force on the detent, at the pad of the slide, in a direction to release the lock, in simulation of the force of parachute drag; and the force applying means connects between the slide and a dynamometer mounted upon the support of the tester.

Pursuant to the invention, this dynamometer is calibrated for reading at, say 1,000, 2,000, 3,000 and 4,000 pound values. Accordingly, with the lock pre-set for an intended parachute release load, readings may be visually taken from the dynamometer and recorded to ascertain whether the lock equipment is up to specification performance-wise.

It is an object of the invention to provide a lock tester of the foregoing general description, which in more specific regards has manually operable, quick-release positioning pins and fixed positioning block and bracket parts, by which the tester is easily and expeditiously anchored to and removed from the system under test, as mentioned in preceding paragraphs.

Moreover, the tester employs a ratcheting turnbuckle-type of operating device in the connection between the detent engaging slide and the dynamometer, which device makes possible a tremendous multiplication of the manually exerted force of the individual performing the test to the slide, in attaining the test loads mentioned above.

The foregoing as well as other objects will become more apparent as this description proceeds, especially when considered in connection with the accompanying drawings illustrating the invention, wherein:

FIG. 1 is a top plan view, partially broken away, of the improved tester of the invention, showing the same as operatively applied and releasably anchored to the framework of a right-hand sub-assembly or unit of a cargo load installation, with the tester in position for the initiation of a test force upon the detent of one of the right-hand locks;

FIG. 2 is a view in side elevation, partially broken away and in vertical longitudinal section along line 2—2 of FIG. 1 to show the manner in which the tester releasably anchors to the frame-work of the cargo system; and FIG. 3 is a view in transverse vertical section along broken line 3—3 of FIG. 1, further illustrating the releasably anchoring means, as well as giving a view in end elevation of the slide of the tester.

FIG. 1 of the drawings shows the improved tester of the invention, generally designated by the reference numeral 10, when the latter is operatively mounted on and anchored to the aircraft's cargo floor frame-work and restraint rail structure, which is generally designated by the reference numeral 12. This structure comprises a frame 14 which is fixedly mounted in an appropriate manner to the floor of aircraft cargo space interior, the frame 14 including an upright web portion 15 having a top horizontal flange 16 projecting laterally from both sides of web 15; and the portions 15 and 16 of frame 14 serve as a side restraint rail for load pallets to be locked in place.

As illustrated in the Mollen et al. application, a series of load supporting rollers 18 are journaled by the cargo floor frame structure 12, for example, between a pair of parallel, upright and longitudinally extending parallel plates 19, 19' of the latter paralleling the pallet side restraint rail. Frame 14 also includes longitudinally spaced, transverse parallel bars 20 of generally I-beam shaped cross section, which bars project from a side of the frame 14 and serve a further purpose not germane to the invention. However, the plates 19' and transverse bars 20 afford at the intersection thereof two corners of a rigid box-like frame sub-structure 21 (FIG. 1), in relation to which the tester 10 of the invention is in part releasably anchored, with the remainder of the anchorage being effected beneath the restraint rail top flange, all as hereinafter described.

The tester itself comprises a flat bottom base plate 22 of elongated rectangular outline which, as illustrated in FIG. 3, has an integral upright rib 23 approximately medially of its width. Rib 23 is formed along the top thereof to provide a lip 24 extending at 90° therefrom toward the restraint rail, when the tester is operatively mounted; and a slide 25 of tester 10, as supported upon the base plate 22 just to the left of the rib 23 (FIG. 3), is restrained from above by lip 24.

A mounting and slide guiding block 27 is secured by a pair of bolts 28 to the top of base plate 22, the block being in transversely spaced relation to the guide rib 23 of the plate; and block 27 has an integral lip 29 which, as indicated in FIGS. 1 and 3, is in the horizontal plane of rib lip 24 and also overlaps the top of slide 25. Thus, the slide is positively restrained and guided for longitudinal sliding action between the guide block 27 and the base plate rib 23.

For the purpose of aiding in mounting tester 10 upon the floor frame work structure 12, the block 27 includes a transversely projecting locator nose 31 on the side thereof opposite its lip 29, which nose is bevelled at its top and bottom, enabling it to be slipped beneath the top flange 16 of floor frame 14, thus properly positioning tester base plate 22 in relation to the restraint rail web portion 15, by reason of the nose 31 abutting the latter, as illustrated in FIG. 1.

The quick alignment and mounting of the tester is also effected with the assistance of a small positioning bracket 32 (dotted line in FIG. 1) bolted to an upright side flange 33 of base plate 22 at a location substantially spaced lengthwise from the slide guiding and tester positioning block 27. Bracket 32 also extends beneath the flange 16 of restraint rail member 14 and abuts against the upright portion 15 of the latter.

The bottom surface of base plate 22 of the tester has a pair of longitudinally spaced anchoring jaws or hooked lugs 35, 36 welded or otherwise rigidly affixed thereto; and these lugs are positioned so as to interlock beneath the top flanges of the two transverse bars 20 of frame 14, as illustrated in FIGS. 1 and 2. Thus, the base plate 22 is strongly anchored against movement to the left, or up and down movement, in the use of the tester, as well as against transverse shift by means of the components 23, 27, 32, 35 and 36, and further means, as now to be described.

The provisions for releasably mounting and anchoring tester 10 on the floor frame structure 12 are completed by a pair of retractable locating and anchoring pin devices, such as are generally designated by the reference numeral 38. Each comprises a movable locating and anchoring pin 39, which is received for vertical action in a hole through plate 22 at a point where the inner upright plate 19 of the rectangular frame sub-structure 21 intersects a transverse bar 20 of the latter. The pins 39 are thus received exactly at two of the corners of the sub-structure which are transversely remote from the latter's restraint rail portion 15. Devices 38 therefore coact with block 27, bracket 32 and jaws 35, 36 in affording a very effective, quick apply and quick release mount of tester 10 to the frame structure 12.

For the operation of the pin devices 38, the plate 22 is provided at its bottom with a pair of fixed guide collars 40 through which the pins downwardly project when the plate is in operative position. Each pin 39 is pivotally connected by a short intervening link 41 with a medial point of an operating arm of lever 42; and the inner end of this lever is fulcrumed at 43 between the arms of an upright clevis bracket 44 bolted to the top of base plate 22. Accordingly, it is seen that a counter-clockwise swing (FIG. 3) of the lever 42 results in the retraction of the associated locating and locking pin 39 out of the operative lock-up position of the pin which appears in FIGS. 2 and 3.

As best illustrated in FIGS. 1 and 3, the slide 25 of tester 10 has a pair of integral longitudinally spaced, transversely projecting operating or force-applying dogs 45, 45' and it is through the agency of one or the other of these dogs that test force is directly applied to a lock in testing the same. Two dogs are provided in order to enable the tester 10 to be conveniently applied to the frame structure 12 for testing of locks at different longitudinal spacings along the restraint rail web 15. Each of the operating dogs 45, 45' is, as shown in FIG. 1, clad at a nose thereof with a wear pad 46.

It is to be understood that, as illustrated and described in the above-entitled Mollon et al. application, the restraint rail web has parachute delivery lock or latch mechanisms 47 bolted or otherwise secured thereto at longitudinally spaced pallet locking stations along the latter, the web 15 having horizontal slots 48 at these stations (FIG. 1) through which extend the detent dogs 49 of the respective locks 47. It is the purpose of one or the other of the operating dogs 45, 45' of slide 25 to engage against a lock dog 49 from the right (FIG. 1) and exert thereon a force corresponding to the force at which the lock or latch mechanism 47 is intended to yield under parachute drag. If it yields to a lesser force or only to a greater force, the lock is reset as to its resistance, or may be removed for replacement or repair.

The reference numeral 50 generally designates a 5,000 pound capacity dynamometer of conventional nature which is fixedly attached to the base plate 22 of tester 10 adjacent the right-hand end thereof, as viewed in FIGS. 1 and 2. Dynamometer 50 includes an indicator 51 adapted to sweep a circular dial 52 of the instrument, which dial has appropriately calibrated, distinct markings $a$, $b$, $c$ and $d$ at intervals, representing release force ranges in the neighborhood (plus or minus 10%) of 1,000 2,000, 3,000 and 4,000 pounds. A horizontally swingable protective cover plate 54 for dynamometer 50 is pivotally mounted at 55 on base plate 22.

The dynamometer has the usual anchoring or reaction arm 56 thereof pivotally mounted by means of an upright pin 57 within the arms of a forked anchoring bracket or clevis 57, which member is fixedly secured by bolts 59 onto the top of base plate 22. The operating and force transmitting arm 60 of dynamometer 50 is received between the clevis arms 62 of a turnbuckle screw 63, being pivotally mounted therein by means of an upright pin 64.

Screw 63 is threadedly received in a tubular turnbuckle body 66, the opposite end of which receives, with a reversely threaded connection, the second screw 67 of the turnbuckle unit, which is generally designated 68. Screw 67 has an end eye 69 pivotally connected by a horizontal pin 70 within an integral upright clevis 71 adjacent the right hand end of slide 25, as viewed in FIGS. 1 and 2. A reversibly ratcheting-type of operating arm 73 for turnbuckle unit 68 is appropriately connected to the body 66 of the latter to rotatively drive the same in either direction, thus to apply and release tensile test force between slide 25 and dynamometer 50.

The invention contemplates the provision of hand grips 75 for convenience in use of the tester. Likewise, since the operating arm 73 of ratchet unit 68 usually includes a removable hand piece 76, the latter may be stowed, when removed, in a pair of spring clips 77 (FIG. 1) on base plate 25.

It is believed that the operation of tester 10 will be evident from the foregoing description. As operatively mounted to the floor frame structure 12 by recourse to the base plate locating block 27 and bracket 32, the retractable devices 38 and the jaws 35, 36, the tester slide 25 is stably guided longitudinally in both directions. Upon ratcheting operation of turnbuckle unit 68, one or the other of the slide's force-applying dogs 45, 45' imparts any desired degree of test force to the detent dog 49 of a latch 47, as observed at the dynamometer 50, and any necessary corrective action may then be taken.

Turnbuckle unit 68 builds up an operator's normal and non-excessive muscle power to the very high degree requisite for the test. The test having been carried out, tester 10 is quickly released and removed from frame 14 for a test at another lock along the latter's restraint rail portion.

What is claimed is:

1. A tester for aircraft cargo restraint locks of the type having a laterally projecting locking dog, comprising a support having means to mount the same rigidly but removably in operative relation to a lock to be tested, a member mounted on said support for movement thereon, said member having laterally projecting means engageable with said locking dog to apply a test force thereto, force-exerting means operatively connected to said member to cause said laterally projecting means of the latter to apply said test force, and a device mounted on said support and operatively connected directly and mechanically to said force-exerted means as a reaction unit, said device indicating a function of the applied test force.

2. A tester for aircraft cargo restraint locks of the type having a laterally projecting locking dog, comprising a portable, elongated plate-like support having quick applying and releasing dowel-type means to mount the same rigidly but removably in operative relation to the mount of a lock to be tested by applying a test force to the locking dog of the lock, a slide mounted on said support for longitudinal sliding movement therealong, said slide having a transversely extending dog engageable with said dog of the tested lock to apply a test force thereto, force-exerting means operatively connected to said slide to cause said dog of the latter to apply said test force with a multiplication of the force exerted on said operatively connected means for the purpose, and a calibrated instrument mounted on said support and operatively connected directly and mechanically to said force-exerting means as reaction unit, said instrument indicating a range of applied test forces.

3. The tester of claim 1, in which said force-exerting means includes means multiplying the force exerted thereon to a value necessary for the force-applying purpose.

4. The tester of claim 1, in which said support and member have coacting means to guide the latter for sliding movement on the former under lateral restraint in two directions transverse of the direction of slide of said member.

5. The tester of claim 1, in which said support and member have coacting means to guide the later for sliding movement on the former under lateral restraint in two directions transverse of the direction of slide of said member, said force-exerting means including means multiplying the force exerted thereon to a value necessary for the force-applying purpose.

6. The tester of claim 1, in which said mounting means of support has locating members, some fixed thereon and some movable relative thereto, for coaction with said lock in the quick application and quick release of the tester relative to the lock.

7. The tester of claim 1, in which said support and member have coacting means to guide the latter for sliding movement on the former under lateral restraint in two directions transverse of the direction of slide of said member, said force-exerting means including means multiplying the force exerted thereon to a value necessary for the force-applying purpose, said, mounting means of support having locating members, some fixed thereon and some movable relative thereto, for coaction with said lock in the quick application and quick release of the tester relative to the lock.

8. The tester of claim 2, in which said quick applying and releasing means includes at least one locating member fixed on the support and releasably engageable with the mount of the tested lock in at least one direction and at least one locating member movably mounted on said support to releasably engage the lock mount in another manner.

9. The tester of claim 2, in which said quick applying and releasing means includes at least one locating member fixed on the support and releasably engageable with the mount of the tested lock in at least one direction, another locating member fixed on the support and releasably engageable with the lock mount at 90° to that direction, and at least one locating member movably mounted on said support to releasably engage the lock mount in another manner.

10. The tester of claim 2, in which said slide is mounted on the support by means guiding and restraining the slide in two directions transverse of its sliding movement along the support.

11. The tester of claim 2, in which said force multiplying and exerting means comprises a reversely actuable device operatively connected to said slide and said instrument to transmit force therebetween in opposite directions.

12. The tester of claim 2, in which said slide is mounted on the support by means guiding and restraining the slide in two directions transverse of its sliding movement along the support, said quick applying and releasing means including at least one locating member fixed on the support and releasably engageable with the mount of the tested lock in at least one direction and at least one locating member movably mounted on said support to releasably engage the lock mount in another manner, said force multiplying and exerting means comprising a reversely actuable device operatively connected to said slide and said instrument to tranmsit force therebetween in opposite directions.

13. The tester of claim 2, in which said slide is mounted on the support by means guiding and restraining the slide in two directions transverse of its sliding movement along the support, said quick applying and releasing means including at least one locating member fixed on the support and releasably engageable with the mount of the tested lock in at least one direction, another locating member fixed on the support and releasably engageable with the lock mount at 90° to that direction, and at least one locating member movably mounted on said support to releasably engage the lock mount in another manner, said force multiplying and exerting means comprising a reversely actuable device operatively connected to said slide and said instrument to transmit force therebetween in opposite directions.

14. The tester of claim 8, in which there are at least two of said fixed locating members on said support in longitudinally spaced relation to one another, said locating members being unidirectionally engageable in overlapping relation to a horizontally extending portion of said mount of the tested lock.

15. The tester of claim 8, in which there are at least two of said fixed locating members on said support in longitudinally spaced relation to one another, said locating members being unidirectionally engageable in overlapping relation to a horizontally extending portion of said mount of the tested lock, and being of a length to engage in abutment against a vertical portion of said mount.

16. A tester for aircraft cargo restraint locks, comprising a portable, elongated plate-like support having quick applying and releasing means to mount the same in operative relation to the mount of a lock to be tested by applying a test force to a restraining member of the lock, a slide mounted on said support for longitudinal sliding movement therealong, said slide having transversely extending means engageable with said restraining member of the tested lock to apply a test force thereto, force-exerting means operatively connected to said slide to cause said means of the latter to apply said test force with a multiplication of the force exerted on said operatively connected means for the purpose, and a calibrated instrument mounted on said support and operatively connected to said force-exerting means as a reaction unit, said instrument indicating a range of applied test forces, said quick applying and releasing means including at least one locating member fixed on the support and releasably engageable with the mount of the tested lock in at least one direction and at least one locating member movably mounted on said support to releasably engage the lock mount in another manner.

17. The tester of claim 16, in which said quick applying and releasing means has another locating member fixed on the support and releasably engageable with the lock mount at 90° to the last named direction.

18. The tester of claim 16, in which said slide is mounted on the support by means guiding and restraining the slide in two directions transverse of its sliding movement along the support.

19. The tester of claim 16, in which said force multiplying and exerting means comprises a reversely actuable device operatively connected to said slide and said instrument to transmit force therebetween in opposite directions.

References Cited

UNITED STATES PATENTS

| | | | |
|---|---|---|---|
| 310,845 | 1/1885 | Overbach | 73—143 |
| 942,006 | 11/1909 | Morehead | 73—143 |
| 1,249,118 | 12/1917 | Klofkorn | 73—143 |
| 2,419,293 | 4/1947 | Simonson | 73—95 X |

JAMES J. GILL, *Primary Examiner.*

C. M. OVERBEY, *Assistant Examiner.*

U.S. Cl. X.R.

73—143